United States Patent [19]

Moridaira

[11] Patent Number: 5,386,541
[45] Date of Patent: Jan. 31, 1995

[54] METHOD OF COPYING SYSTEM DATA AND COPYING ADAPTOR THEREFOR

[75] Inventor: Hideo Moridaira, Tokyo, Japan

[73] Assignee: Meisei Electric Co., Ltd., Tokyo, Japan

[21] Appl. No.: 141,479

[22] Filed: Oct. 21, 1993

Related U.S. Application Data

[63] Continuation of Ser. No. 675,131, Mar. 26, 1991, abandoned.

[30] Foreign Application Priority Data

Jul. 17, 1990 [JP] Japan .................. 2-188339

[51] Int. Cl.⁶ ........................... G06F 13/10
[52] U.S. Cl. ............... 395/425; 364/DIG. 1; 364/243.3; 235/492
[58] Field of Search ... 364/200 MS File, 900 MS File; 395/400, 425; 235/380, 492

[56] References Cited

U.S. PATENT DOCUMENTS

| | | | |
|---|---|---|---|
| 4,506,322 | 3/1985 | Leigh | 395/800 |
| 4,748,320 | 5/1988 | Yorimoto | 235/380 |
| 4,782,541 | 11/1988 | Oshikata et al. | 379/165 |
| 4,783,737 | 11/1988 | Ara et al. | 395/425 |
| 4,802,218 | 1/1989 | Wright et al. | 235/380 |
| 5,019,697 | 5/1991 | Postman | 235/492 |
| 5,038,025 | 8/1991 | Kodera | 235/492 |
| 5,122,643 | 6/1992 | Gamou et al. | 235/384 |
| 5,136,146 | 8/1992 | Anglin et al. | 235/441 |
| 5,150,024 | 9/1992 | Kimura et al. | 318/568.1 |

*Primary Examiner*—Joseph L. Dixon
*Assistant Examiner*—Hiep T. Nguyen
*Attorney, Agent, or Firm*—McAulay Fisher Nissen Goldberg & Kiel

[57] ABSTRACT

A method of copying system data at the time of updating of a main control apparatus in a system using a computer, and a copying adaptor used for this method. The method comprises replacing the control program memory of a main control apparatus, when it is updated, by an adaptor having the function of transferring and retaining system data, transferring and storing the system data stored in the system data memory of the main control apparatus to and in the adaptor, and connecting the adaptor to a new main control apparatus to transfer the system data so as to store the system data in the system data memory of the new main control apparatus.

5 Claims, 3 Drawing Sheets

METHOD OF COPYING SYSTEM DATA AND COPYING ADAPTOR THEREFOR

This is a continuation of application Ser. No. 07/675,131, filed Mar. 26, 1991, now abandoned.

BACKGROUND OF THE INVENTION a) Field of the Invention

This invention relates to a method of copying system data at the time of updating of a main control apparatus in a system using a computer, and to a copying adaptor used for this method.

b) Description of the Prior Art

A system controlled by a computer (hereinafter referred to as a "computer system") has generally a main control apparatus for causing this system to function and this main control apparatus comprises generally a CPU for control, a memory storing a control program (for which ROM is generally used), a memory storing system data for the operation of the system (for which RAM is generally used and is made non-volatile by backup by a battery) and various CPU associated circuits (interfaces with peripheral circuits, etc.), and the like.

A key telephone system or a PBX (private branch exchange) system may be considered as a typical example of the computer system described above. The main control apparatus in these systems comprises a portion which is prepared by mounting the control CPU, the system data storage RAM and various CPU associated circuits onto a printed board and is generally referred to as a "CPU card" and a portion which is prepared by mounting the program storage ROM for the control CPU described above onto a printed board and is generally referred to as a "ROM card". These card portions are connected with each other through a connector. The program storage portion is constituted as a separate member from the other portions described above so that the change of the control program at the time of change of system functions (version-up) can be made through only the exchange of the ROM card.

When the necessity of exchanging (updating) the CPU card described above occurs in the system having the construction described above due to trouble in the CPU card or to overall trouble in the system, it is by no means easy to input afresh all the system data manually into the system data storage memory of a new CPU card. Thus, data such as speed dial (one-touch dial), which is to be inputted by an individual user of each terminal telephone set, cannot be stored unless the individual makes the required input operation.

Accordingly, the system data stored in the CPU card is generally transferred (copied) before updating (hereinafter referred to as the "old CPU card") to the new CPU card.

The conventional copying methods of the system data include a method which connects a computer to an old CPU card, transports and stores, once, the system data to and in this computer and transports the system data from the computer to a new CPU card, and a method which constitutes the portion for storing the system data in a card form which is independent of other portions, removes this card from the old CPU card when the CPU card is exchanged and fits it to a new CPU card.

However, the conventional methods described above involve the following drawbacks. The former method needs to dispose a port (generally RS232C) for connecting a computer, which is not necessary for an ordinary operation, to the CPU card. The CPU card therefore becomes complicated in structure and, also, more expensive. Furthermore, a computer which is not usually necessary must be prepared. Still another problem is that this method cannot copy those data which are inputted by individuals such as the speed dial data because such data are guarded (lest they can be read out by the computer) for the purpose of securing privacy.

According to the latter method, a split loss occurs because the system data storage portion is separated from the CPU card, thus causing deterioration of the space factor, and various other problems such as the reduction of reliability due to the use of the connector. Furthermore, when the card of the system data storage portion is removed, the storage data of the memory of this card must be retained. This means that the card itself needs memory backup means and the circuit configuration gets just as complicated.

SUMMARY OF THE INVENTION

The present invention is directed to providing a solution for these problems.

In order to accomplish this object, the present invention prepares an adaptor having the transporting and retaining functions of system data or more specifically, a copy adaptor comprising RAM backed up by a battery, for example, and ROM storing therein a data transport program, and the ROM card of the old CPU card is replaced by the copy adaptor so as to transfer and retain the system data in the system data storage RAM of the old CPU card into RAM of the copy adaptor, and then the copy adaptor is connected to a new CPU card so as to transport and store the system data retained by the copy adaptor into the system data storage RAM of the new CPU card.

In accordance with the present invention, the ROM card storing the control program is removed from the old CPU card at the time of the exchange of the CPU card and the copy adaptor is connected to the connection portion of this ROM card. In this manner the system data stored in the old CPU card are transported and retained in RAM of the copy adaptor. This transport control of the system data is executed as the control CPU of the old CPU card operates in accordance with the program stored in the ROM of the copy adaptor. (Trouble in the CPU card occurs in most cases in the CPU associated circuit and the control CPU itself is normal in most cases.)

Thereafter, the old CPU card of the system is exchanged with the new CPU card and the copy adaptor described above is connected to this new CPU card. The system data are then transported and retained from the copy adaptor into the system data storage memory of the new CPU card. The transport control of the system data is executed as the control CPU of the new CPU card operates in accordance with the program stored in ROM of the copy adaptor.

In this manner the system data of the old CPU card can be copied into the new CPU card.

The above and other objects and novel features of the present invention will become more apparent from the following detailed description when taken in conjunction with the accompanying drawings.

BRIEF DESCRIPTION OF THE DRAWINGS

The accompanying drawings illustrate a preferred embodiment of the present invention, wherein.

DESCRIPTION OF THE PREFERRED EMBODIMENTS

Figure 1:
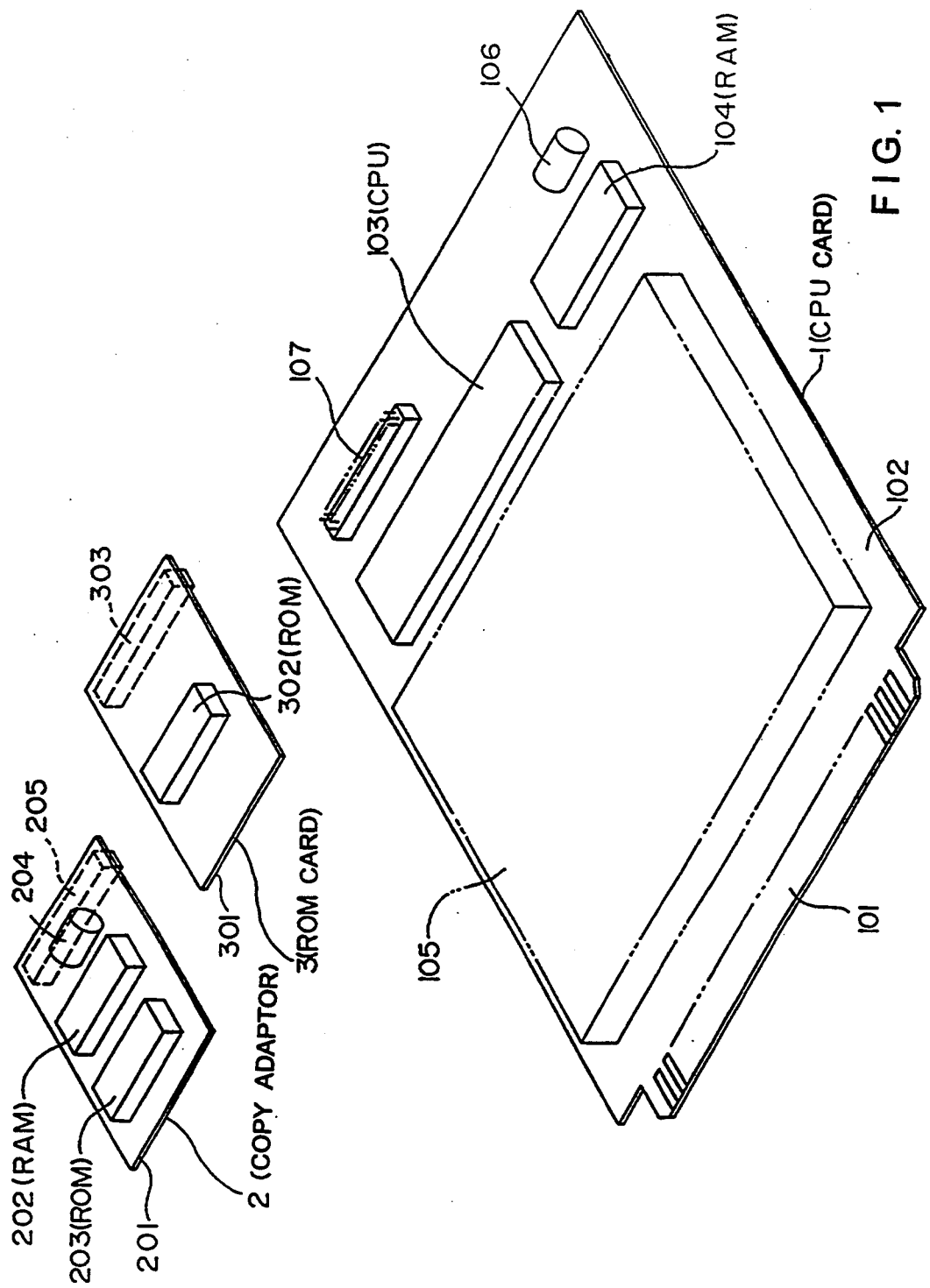
FIG. 1 is a perspective view showing the structure.
Figure 2:
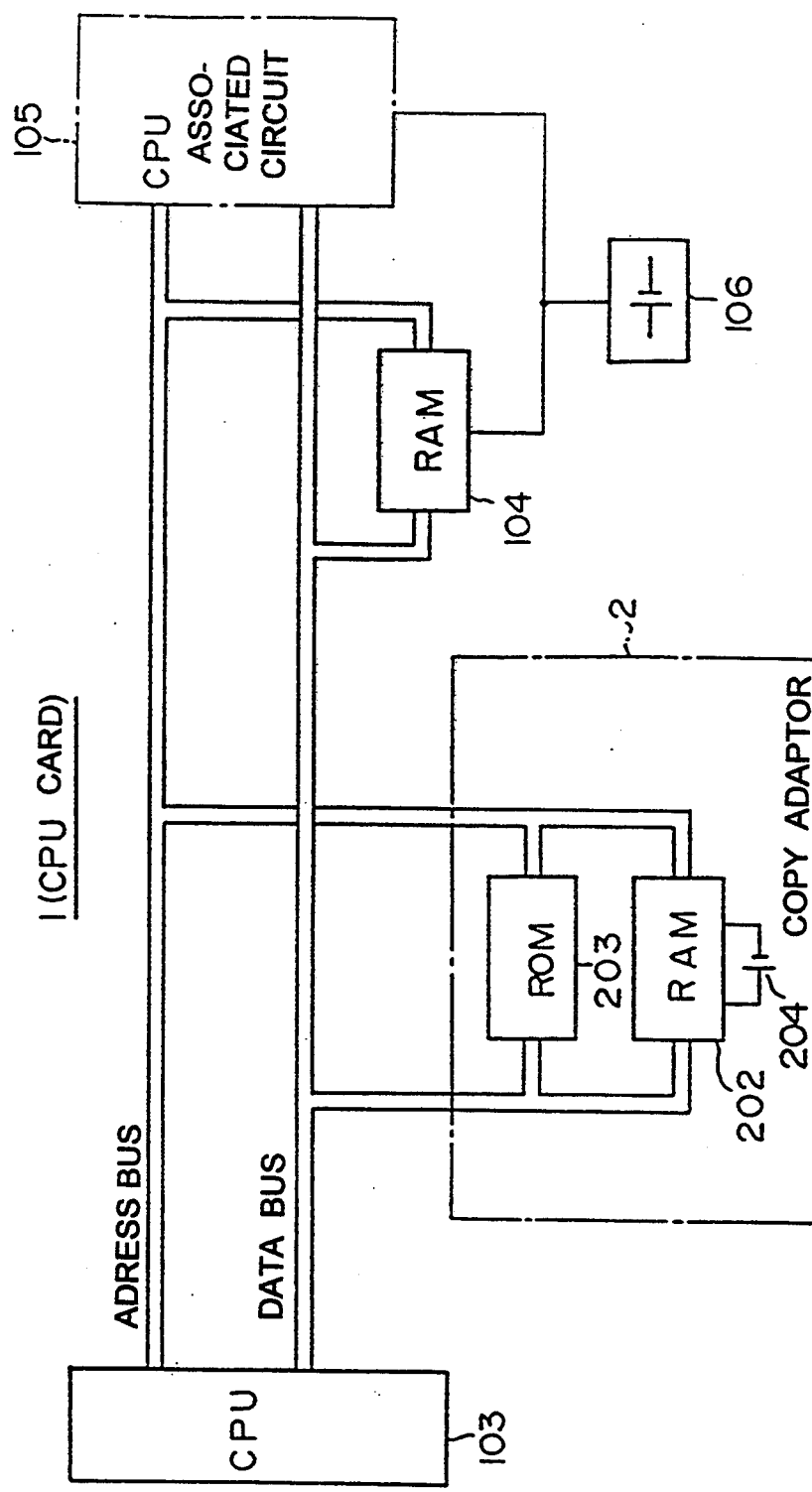
FIGS. 2 and 3 are block diagrams.
Figure 3:
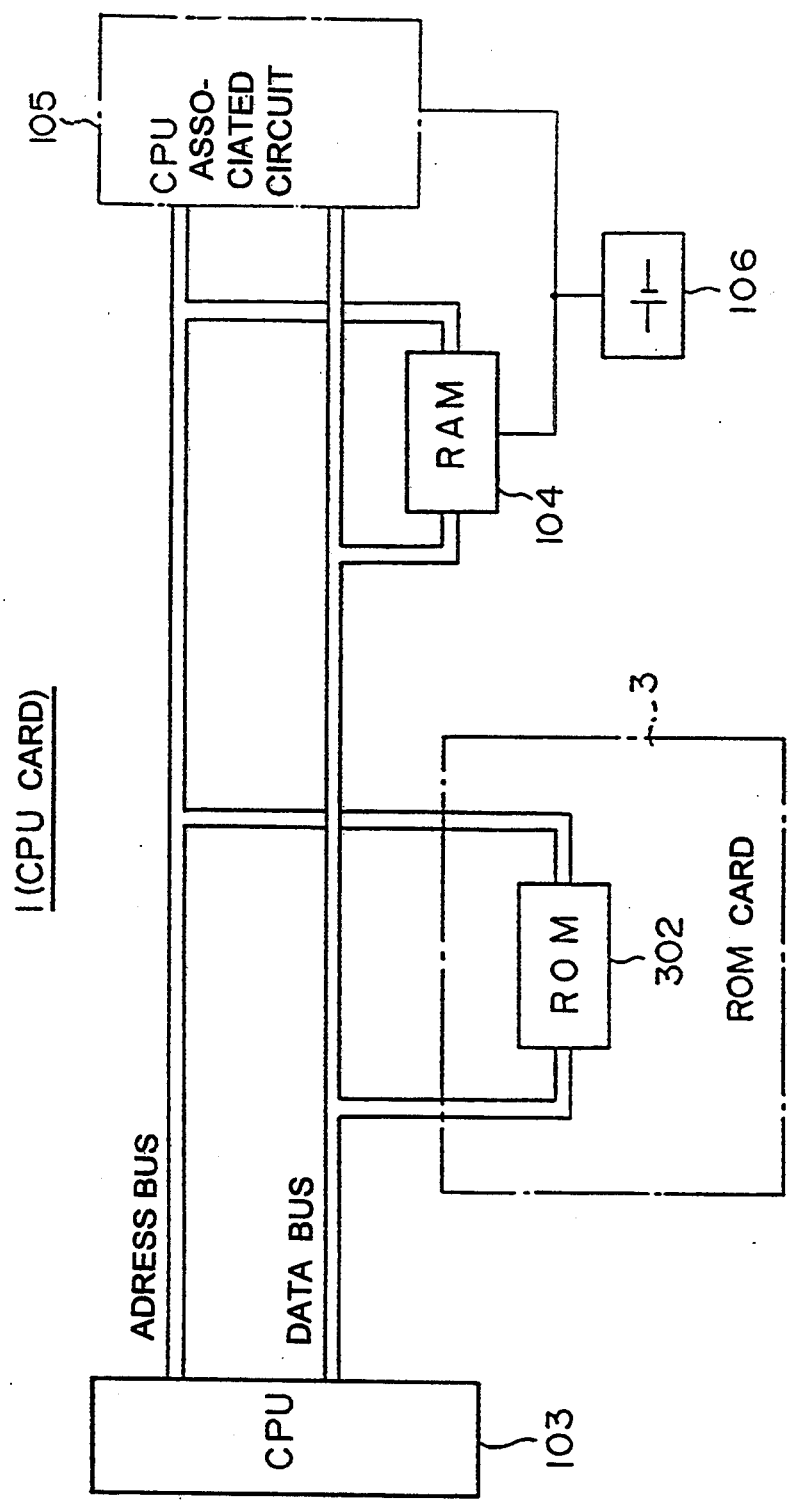

In the drawings,

FIG. 1 is a structural view, FIG. 2 is a block diagram when a copy adaptor is connected to a CPU card and FIG. 3 is a block diagram when a ROM card storing a control program is connected to the CPU card.

Referring to FIG. 1, reference numeral 1 represents a CPU card, 2 is a copy adaptor and 3 is a ROM card.

The CPU card 1 is prepared by mounting control CPU 103, RAM 104 for storing system data, various CPU associated circuits 105, a battery 106 for backing up various memories inclusive of RAM 104 and a connector 107 for connecting the copy adaptor 2 or the ROM card 3 onto a printed board 102 having a connector 101.

The copy adaptor 2 is prepared by mounting RAM 202 for retaining the system data, ROM 203 storing therein a program for transporting the system data and a battery 204 for backing up RAM 202 onto the surface of a printed board 201 and a connector 205 for the connection to the CPU card 1 is mounted to the back of the printed board 201.

The ROM card 3 is prepared by mounting ROM 302 storing the control program for CPU 103 onto the surface of a printed board 301 and a connector 303 for the connection to the CPU card 1 onto the back of the printed board 301, respectively.

In a normal operation of a computer system such as a key telephone system, for example, the ROM card 3 is connected to the CPU card 1 through the connection of the connector 107 to the connector 303 to constitute a main control apparatus of this computer system. The circuit configuration of this main control apparatus during the normal operation is shown in the block diagram of FIG. 3 and CPU 103 executes predetermined control on the basis of the control program stored in ROM 302 and the system data stored in RAM 104. Incidentally, since the system data stored in RAM 104 must be retained when the system is not operated, too, RAM 104 is generally a non-volatile memory backed up by the battery 106. The battery 106 makes the backup operation to retain the stored data of various memories in the CPU associated circuits 105, whenever necessary.

When the main control apparatus does not operate normally due to the trouble of the CPU associated circuit 105 portion of the CPU card 1, or the like, the CPU card 1 must be replaced by a normal one. To exchange the CPU card 1, the power source of the system is first turned OFF and while the broken CPU card (the old CPU card) 1 is kept connected to the system, the ROM card 3 is disconnected from this old CPU card 1 and then the copy adaptor 2 is connected to this old CPU card 1 through the connection between the connector 107 and the connector 204. The state of the main control apparatus at this time is shown in the block diagram of FIG. 2.

When the power source of the system is applied under the state described above, the control CPU 103 of the old CPU card 1 performs the control so as to transport and retain the system data stored in RAM 104 of the old CPU card 1 to and in RAM 202 of the copy adaptor 2 on the basis of the program stored in ROM 203 of the copy adaptor 2.

Next, the power source of the system is turned OFF, the old CPU card 1 is removed from the system and furthermore, the copy adaptor 2 is removed from this old CPU card 1. Since RAM 202 of the copy adaptor 2 is made non-volatile by backup by the battery 204, the system data transported to RAM 202 by the operation described above are retained in RAM 202 even after the copy adaptor 2 is removed from the old CPU card 1.

After the copy of the system data between the old and new CPU cards 1, 1 is completed in the manner described above, the copy adaptor 2 is removed from the new CPU card 1 and the ROM card 3 that has been removed from the old CPU card 1 is connected to the new CPU card 1 through the connection between the connector 107 and the connector 303. Accordingly, the main control apparatus assumes once again the circuit configuration shown in FIG. 3. In other words, the exchange operation of the CPU card 1 of the system is completed without requiring the manual re-making operation of the system data.

As described above, the present invention prepares the copy adaptor having the transporting and retaining functions of the system data, transports and stores the system data by utilizing the CPU for controlling in the CPU card once to and in the adaptor and transports and stores the system data from the adaptor to and in the new CPU card. In this manner the present invention eliminates the necessity of providing the port (RS232C), which is not necessary usually, to the CPU card and of preparing a personal computer or the like as has been required in the prior art technique. The present invention eliminates also the necessity of constituting the system data storage by the RAM card system which has a low space factor and low reliability but can easily copy the system data. The present invention makes it possible to further copy the speed dial data and the like stored by individuals.

The copy adaptor does not require by itself any CPU but can be constituted compactly and economically. Moreover, if a service person of the system carries one copy adaptor, he or she can use it for the repair of any system, so that maintenance of the system becomes easier and the maintenance cost can be reduced drastically.

While the foregoing description and drawings represent the preferred embodiments of the present invention, it will be obvious to those skilled in the art that various changes and modifications may be made therein without departing from the true spirit and scope of the present invention.

What is claimed is:

1. A method of copying system data for a computer system which comprises a main control apparatus including a control CPU, and various CPU-associated circuits inclusive of a control program memory and a system data memory, said control program memory being a separate member from other portions inclusive of said control CPU and connected to said control CPU by a connector, said method comprising the steps of:

replacing the control program memory of a main control apparatus, when it is updated, by an adaptor having a program stored in its program memory for causing transferring and retaining system data from said main control apparatus, said adaptor being connected to said control CPU by said control program memory connector;

transferring and storing the system data stored in said system data memory of said main control apparatus to and in said adaptor;

attaching said adaptor, with said stored system data, to the program memory connector of a new main control apparatus; and enabling the control CPU in said new main control apparatus to transfer the system data from said adaptor so as to store the system data in said system data memory of said new main control apparatus, said adaptor being connected to said new main control apparatus by the control program memory connector of said new main control apparatus; and removing said adaptor from said connector after the system data has been transferred and stored in the system data memory of the new main control apparatus and reconnecting the member containing control program memory to the new main control apparatus in said connector.

2. The method of claim 1 including the step of using said method of claim 1 to replace a malfunctioning main control apparatus with a properly functioning new main control apparatus including the step of determining that a main control apparatus is malfunctioning.

3. In an arrangement for copying system data stored in a main control apparatus having a control CPU and various CPU associated circuits including a control program memory and a system data memory, said control program memory being a separate member and connected to said control CPU by a connector, the improvement comprising:

an adaptor having:

first memory means for storing system data from said system data memory;

second memory means for storing a program for controlling the system data transfer between said first memory means and a system data memory; and means for connecting said adaptor in said connector for connecting said control program memory separate member to said control CPU so that said adaptor may replace said separate member;

wherein copying system data to said adaptor is effected by removing said separate member from and connecting said connecting means of said adaptor to said connector; and wherein copying said system data from said adaptor to a system memory is effected by connecting connecting means of said adaptor to a connector for a control program memory separate member.

4. The arrangement of claim 3 wherein said first memory means includes a RAM-type memory and said second memory means includes a ROM-type memory and wherein means are included for making said RAM-type memory non-volatile.

5. The arrangement of claim 4 wherein said means for making the RAM-type memory non-volatile includes a battery.

* * * * *